May 19, 1936. W. SWALLOW Re. 19,975

VEHICLE

Original Filed Nov. 12, 1934 4 Sheets-Sheet 1

INVENTOR
WILLIAM SWALLOW
BY
John P. Pashby
ATTORNEY

May 19, 1936. W. SWALLOW Re. 19,975

VEHICLE

Original Filed Nov. 12, 1934 4 Sheets-Sheet 2

INVENTOR
WILLIAM SWALLOW

BY

John P. Barbour
ATTORNEY

May 19, 1936. W. SWALLOW Re. 19,975

VEHICLE

Original Filed Nov. 12, 1934 4 Sheets-Sheet 3

INVENTOR
WILLIAM SWALLOW
BY John P. Tarbox
ATTORNEY

VEHICLE

Original Filed Nov. 12, 1934 4 Sheets-Sheet 4

INVENTOR
WILLIAM SWALLOW
BY
John P. Parker
ATTORNEY

Reissued May 19, 1936

Re. 19,975

UNITED STATES PATENT OFFICE 19,975

VEHICLE

William Swallow, Headington, Oxford, England, assignor to Pressed Steel Company Limited, Cowley, Oxford, England, a British company Original No. 2,012,057, dated August 20, 1935, Serial No. 752,747, November 12, 1934. Application for reissue March 6, 1936, Serial No. 67,563. In Great Britain November 10, 1933
16 Claims. (Cl. 296—28)

Figure 1:
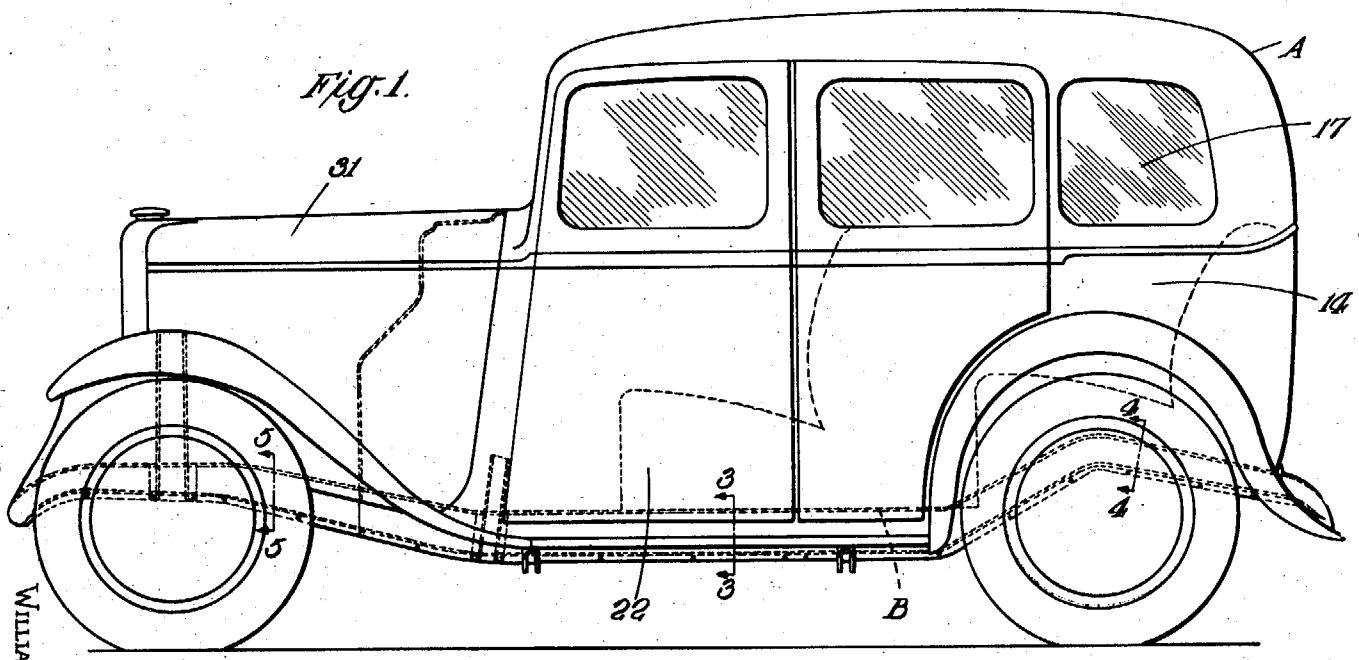

Recent research and experiment in the field of automobile body construction and in the mounting of such bodies on their chassis, has revealed that the elimination of squeaks and rattles and the insuring of a long normal life of the vehicle is determined, apart from the engine, almost solely by the rigidity and stiffness of the chassis frame. Consequently this feature is one of the prime causes of success or non-success of a vehicle. This rigidity is, of course, assisted to a certain extent by the body itself and where it is possible to make the body and chassis as nearly as possible a unitary construction then the best results are obtained.

Many proposals have been put forward to give this greater rigidity and stiffness to a chassis frame. One of the most common methods is the provision of a cruciform bracing member in addition to the normal transverse bracing members, which has been almost universally adopted. Another method is the provision of a box section chassis frame with the usual transverse members, yet again a common method is the formation of box section body side sills adapted to be bolted to the chassis side frame sills. All of these methods, of course, have their advantages and do result in a better performance. They do, however, entail certain manufacturing processes not necessary heretofore, giving increased first cost.

The object of the present invention is to provide a method of assembly of body and chassis frame, resulting in a very rigid structure but which does not necessitate additional manufacturing processes for its effective operation, which is therefore cheap and gives a very reliable result.

According to the present invention a body is mounted on its chassis so that the assembly presents a box section underframe structure.

The chassis side sills may, for example, be simple channel section members, reinforced if desired with the usual cruciform bracing member, the body side panel unit being arranged to overlap the open side of the channel section side sill of the chassis frame to constitute therewith a box section structure.

Preferably the side sills of the chassis frame are outwardly presenting channel section members formed with or without, as desired, flanges substantially in the plane of the side panel assembly, which is secured to said channel section members by, e. g. bolting.

It is to be understood that the box section structure, whilst preferably extending along the full length of the union of the body with the chassis frame, may, if desired, extend only partially therealong, the other portions being substantially of standard construction.

The chassis frame may comprise two longitudinal outwardly presenting channel section members joined at their rear ends by a tubular or other transverse bracing member and further braced intermediately of their length by means of a cruciform structure, the forward ends being braced for example by means of an outrigger construction as described in my copending application for Vehicle chassis frames, Serial No. 783,385, filed August 4, 1934. The lower flange of the outwardly presenting longitudinal channel section members is formed with a vertically depending auxiliary flange to which is bolted the lower edge of the side sill assembly of the body.

The body may comprise a sheet metal construction consisting of a front or cowl unit, two side units, and a tonneau unit, joined together into one complete whole by welding. Each side unit comprises inner and outer unitary stampings, the lower edges of which are arranged to lie to close the open side of the outwardly presenting channel section longitudinal chassis side sills. The inner unitary stamping may be normally flat and vertical and arranged to overlap the upper flange or limb of the channel longitudinal and auxiliary flange thereof, thereby closing the open side of the channel, whilst the outer panel may be suitably contoured, to present e. g. threshold portions, and similarly adapted to overlap the channel longitudinals, both inner and outer unitary stampings being secured to the channels by bolting. In this manner the body at the threshold openings will lie substantially in the plane of the upper face of the channel section longitudinals, thereby providing easy entry into the interior of the body. And fore and aft of the threshold openings, the inner stamping or wall, either alone or in combination with other members, serves to close the channel section sill and form therewith a box section structure. At those portions of the side unit construction constituting the post structures the inner unitary stamping may be cut-out and reinforced by gusset or flitch plates to overlap the upper flange of the channel section longitudinal.

With this construction it is possible to provide continuous chassis side sills of box section extending from the rear of the tonneau to the front of the bonnet or hood, the contour of the body being attained by bridging means or by means of flitch plates arranged to close the open sides of the channels and to be connected with the outer unitary stampings.

A construction as described gives, in effect, a dual box section side sill structure.

Figure 2:
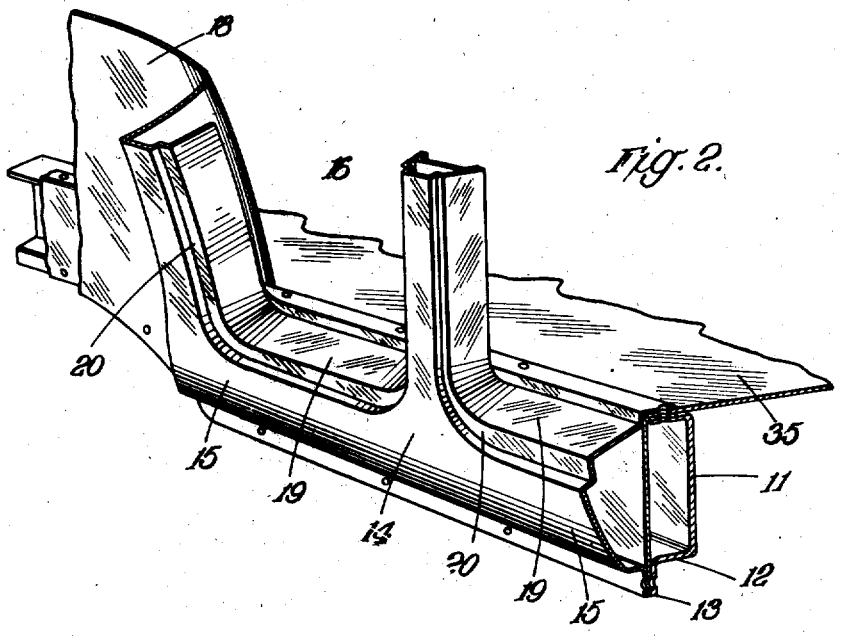
Figure 3:
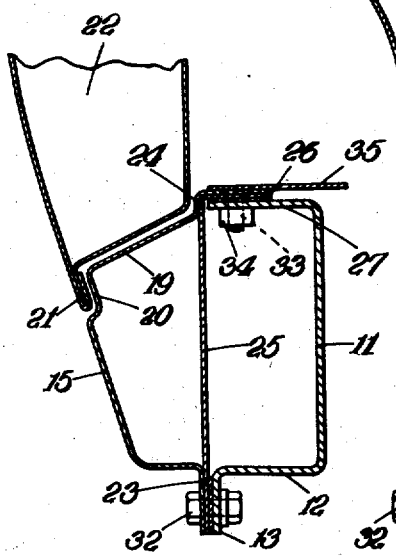
Figure 4:
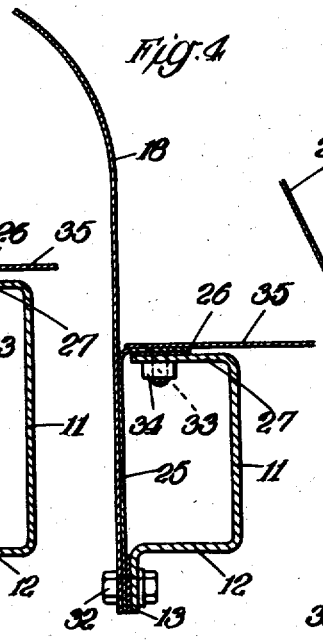
Figure 5:
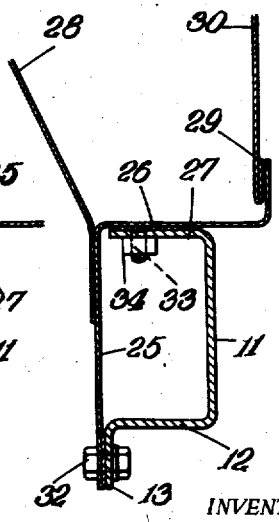
Figure 6:
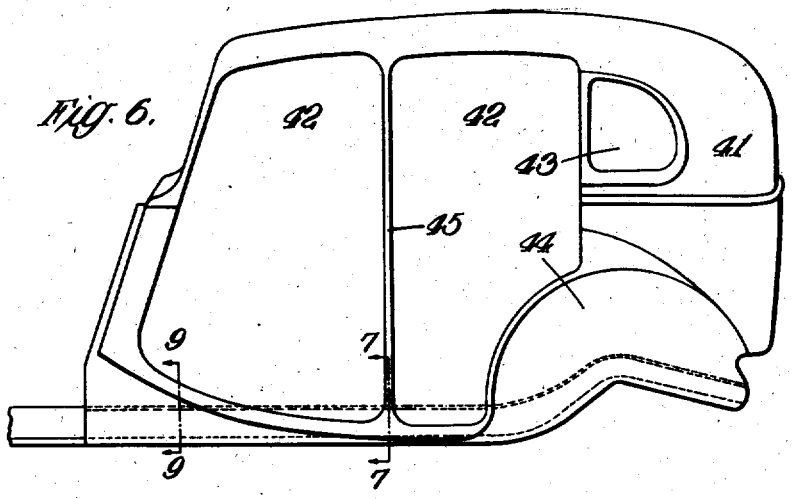
Figure 7:
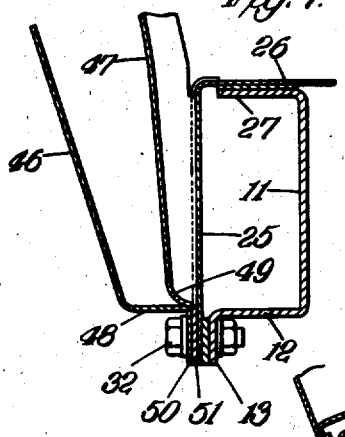
Figure 8:
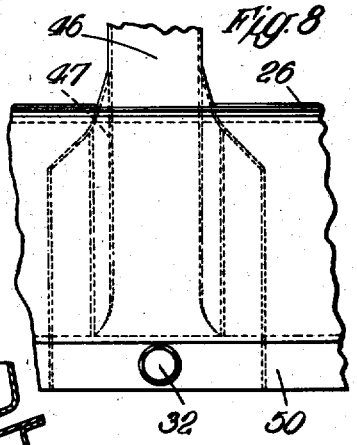
Figure 9:
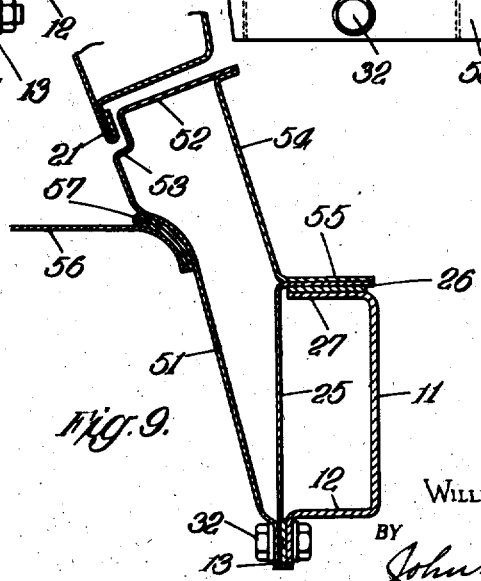

In the accompanying drawings,

Figure 1 is a side elevation of a complete car built in accordance with one form of the invention, Figure 2 is a sectionalized part perspective view showing the mounting of a body on its chassis, Figure 3 is a section to an enlarged scale on the line 3—3 of Figure 1, Figure 4 is a section to an enlarged scale on the line 4—4 of Figure 1, Figure 5 is a section to an enlarged scale on the line 5—5 of Figure 1, Figure 6 is a side elevation of a modified form of vehicle body, Figure 7 is a section to an enlarged scale on the line 7—7 of Figure 6, Figure 8 is an enlarged part side view of the bottom of the B—C post construction, Figure 9 is a section to an enlarged scale on the line 9—9 of Figure 6, and Figures 10–16 are sectionalized part perspective views of further modified forms of the invention, showing different ways of mounting a body on its chassis.

Referring now to Figures 1 to 5, the body A may be substantially of known construction and is mounted on its chassis B as shown clearly in Figures 2 to 5.

Each chassis side frame member comprises an outwardly presenting channel section member 11, the lower horizontal limb 12 thereof being formed with a depending flange 13. The body comprises an outer panel 14, formed as a unitary stamping, having the usual type of reinforcing inner members (not shown) and including door openings 16 and window openings, such as 17, and a rear wheel housing 18, the lower margins 15 of the outer panel 14 being formed with door threshold portions 19, the door openings being further formed with a rabbet 20, to receive the flange 21 of the door 22. Welded at 23 and 24 to the lower margin of the outer panel is a longitudinally extending inner stamping or sill plate 25, formed at its upper edge with an inwardly presenting horizontal flange 26 adapted to overlie the upper horizontal limb 27 of the outwardly presenting channel section side frame 11 of the chassis.

This inner wall or sill plate 25, extends, as will be seen, from the rear of the body to the front of the hood, and forms throughout its length with the chassis sill 11 a box section structure. Along the greater part of the length of the body, the combination of the lower margin 15 of the outer panel 14 and the longitudinally extending sill plate 25 presents an additional outer substantially box section structure, as shown in Figures 2 and 3, whilst at the rear wheel housing the portion 18 of the outer panel lies close against and is secured directly to, the sill plate 25, and forward of the front of the body, the fender or wing skirt 28 is brought down to be welded to the sill plate 25, the horizontal flange 26 of which is extended further inwardly and finally further flanged upwardly as at 29, to constitute a seating for the side member 30 of the bonnet or hood 31.

When the body is mounted on its chassis, it is secured thereto by bolts 32 passing through the depending flange 13 of the chassis side frame member 11 and countersunk screws 33 passing into the upper horizontal limb 27 of the chassis side frame member 11, and secured by clinch nuts 34 or the like.

It will be clear that such mounting immediately provides, with the outwardly presenting channel section chassis side frame member, a double box section structure, in the region of the door thresholds, and a single box section structure extending beyond such region both to the front and rear of the vehicle.

Where desired, a floor board 35 may be secured by welding to the horizontal flange of the threshold portion 19 and overlying the upper horizontal limb 27 of the chassis side frame member.

Referring now to Figures 6 to 9, Figure 6 shows a modification of the invention, wherein the body style differs from that so far described.

As before, the body includes a unitary outer stamping 41, formed with the usual door and window openings 42 and 43 respectively, and the rear wheel housing 44, but the side sill construction towards the front of the body differs somewhat, in that it is given an upward rake.

The chassis side frame comprises, as before, the outwardly presenting channel section member 11, the lower horizontal limb 12 of which is formed with a depending flange 13.

The mounting of the body in the region of the B—C post 45, is shown in Figures 7 and 8, where the outer panel 46 of the B—C post is reinforced by a channel section member 47, both extended downwardly and turned in at their lowermost edges as at 48, 49 and flanged downwardly as at 50, 51, to abut against the flange 13 of the chassis frame 11 and be secured thereto by the bolts 32. The longitudinally extending sill plate 25, as before, forms with the lower margins of the outer panel, a substantially box section structure, such plate 25 overlapping the outwardly presenting channel section chassis frame member 11, to provide a closure therefor and therewith present a further box-section structure.

Towards the front of the body, see Figure 9, the threshold portions of the body are elongated upwardly, the outer panel 51, being formed with the threshold rail 52 and rabbet 53 and having secured thereto a reinforcing member 54 flanged inwardly at its lower end as at 55 to overlie the inturned flange 26 of the sill plate 25, itself overlapping the limb 27 of the chassis frame 11. A running board 56 is shown secured, with the interposition of a weather strip 57, to the outer panel 51.

Figure 10:
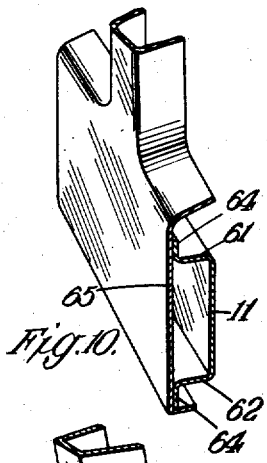

Figure 10 shows one method of mounting the body on the chassis without the use of the longitudinally extending sill plates. The horizontal limbs 61, 62 of the chassis frame 11 are each formed with vertically extending flanges 63, 64, against which bears directly the lower margin 65 of the outer panel, being secured thereto by welding or bolting (not shown).

Figure 11:
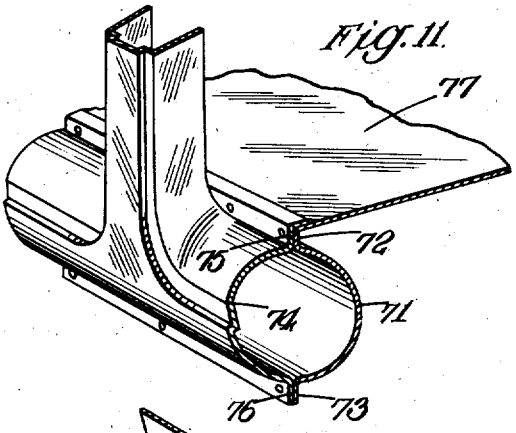
Figure 12:
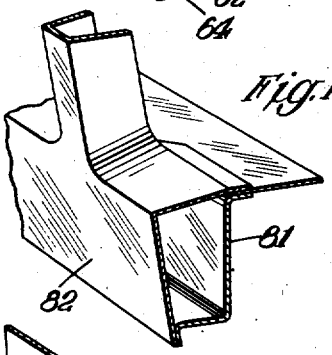
Figure 13:
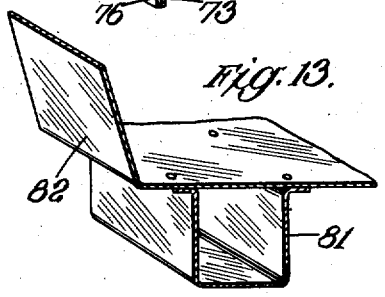
Figure 14:
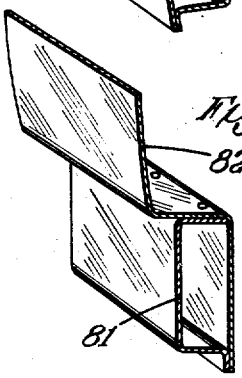
Figure 15:
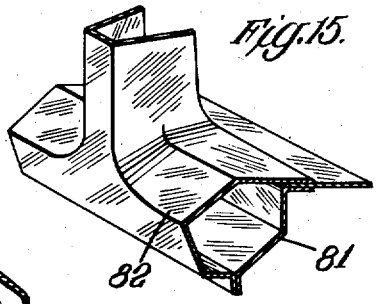
Figure 16:
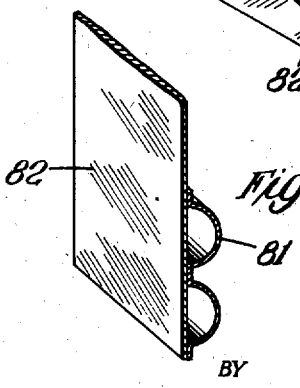

In Figure 11 is shown a modification, adaptable particularly for a tubular construction. The chassis frame is formed of outwardly presenting semicylindrical members 71, formed with vertical flanges 72, 73, whilst the lower margins of the outer panel of the body are constituted by inwardly presenting semicylindrical sections 74, formed with flanges 75, 76 adapted to abut the flanges 72, 73 and be secured thereto by bolting, a floor board 77 being welded or otherwise secured to a horizontal extension of the flange 75.

Figures 12 to 16 show different forms of chassis side frame member 81 to which the body 82 is secured to present a box section structure.

It will be clear from the foregoing that there is provided a structure which is exceedingly simple, and substantially cheaper to produce, no additional manufacturing processes being required, whilst the result is one giving greater rigidity and strength than heretofore to the ultimate framework, resulting in a construction having greater durability and considerably less likelihood of developing those undesirable squeaks and rattles met with so frequently.

I claim:

1. In a vehicle construction, a body comprising a unitary outer side panel formed in its lower margins with threshold portions including a downwardly extending outer wall from the threshold portions and a longitudinally extending sill plate reinforcing said threshold portions, said threshold portions and sill plate being of a vertical depth extending when assembled to the bottom of the chassis, in combination with a chassis sill member of outwardly presenting channel section assembled therewith and forming with said sill plate a box section combined body and chassis sill structure.

2. In a vehicle construction, a body comprising a unitary outer side panel formed in its lower margins with threshold portions and a longitudinally extending sill plate of angular section reinforcing said threshold portions, in combination with a chassis sill member of outwardly presenting channel section, assembled therewith and forming a box section combined body and chassis sill structure, a limb of said angular section sill plate overlapping the upper horizontal limb of said outwardly presenting channel section chassis sill member and secured thereto.

3. In a vehicle construction, a chassis sill member of outwardly presenting channel section, a body comprising a unitary outer side panel formed in its lower margins with threshold portions, and a longitudinally extending reinforcing sill plate interposed between said sill member and the threshold portions of the body and forming therewith inner and outer box section structures.

4. In a vehicle construction a chassis sill member, a unitary body outer side panel formed in its lower margin with threshold portions, said threshold portions being reinforced by a sill plate arranged to form with said chassis sill member a box section structure, said sill plate being formed with an inturned horizontal flange constituting an apron between the wing and bonnet of the vehicle and a seating for the latter.

5. In a vehicle construction, a chassis sill member, a unitary body outer side panel formed with a wheel housing depression, a longitudinally extending sill plate reinforcing the lower portion of said wheel housing depression, the wheel housing depression lying against and secured to said sill plate, and the wheel housing depression and sill plate in their overlapped regions forming with the chassis sill member a box section structure.

6. In a vehicle construction, a separate chassis construction including a chassis sill member of outwardly presenting channel section, the lower horizontal limb of said member being formed with a depending flange, in combination with a unitary body side wall structure having its lower margin provided with threshold portions of box section and adapted to be assembled therewith in final assembly and secured to said depending flange and forming with the channel section of the sill a double box section combined body and chassis sill.

7. In a vehicle construction, a chassis including a chassis sill structure of hollow open-sided section, in combination with a unitary body side wall structure formed adjacent its lower margins with threshold portions of box section projecting laterally, and the lower margins of the side wall structure being adapted when finally assembled to cover the open side of said sill structure and form with said chassis sill structure a combined body and chassis sill structure of double box section.

8. In a vehicle construction, a chassis including a chassis sill structure, in combination with a unitary body side wall structure formed in its lower margin with threshold portions of box section, said side wall structure from said threshold portion downwardly being of box section of substantially the same height as the height of said chassis sill structure, and adapted when finally assembled to cover the side of said sill structure and form with said chassis sill a combined body and chassis sill structure of double box section.

9. In a vehicle construction, a chassis including a chassis sill structure of open section outwardly presented, in combination with a unitary body side wall structure formed in its lower margin with threshold portions, said side wall structure from said threshold portion downwardly being of open section inwardly presented of substantially the same height as the height of said chassis sill structure, and adapted when finally assembled to cover the side of said sill structure and form with said chassis sill structure a combined body and chassis sill structure of box section, and a partition between the said body section and the said sill structure section and common to both.

10. In a vehicle construction, a chassis sill member of outwardly presenting channel section having a flange extending from its lower limb, a body comprising a unitary outer side panel formed in its lower margins with threshold portions having inwardly extending flanges in the thresholds and a downwardly extending flange at the lower edge of said side panel, the threshold flanges seating on top of the said chassis sill member and secured thereto, and the downwardly extending flange secured to the flange on the lower limb of the said member in the final assembly of said body and chassis sill.

11. In a vehicle construction, a chassis sill member of outwardly presenting channel section having a flange extending from its lower limb, a body comprising a unitary sheet metal side panel having a flange extending inwardly at the thresholds of the door openings and a downwardly extending flange at the lower edge thereof, said side panel flanges being arranged in the final assembly of said body with the chassis sill member to overlap, respectively, the top limb and the flange of the lower limb of said sill member and be secured thereto in said overlaps.

12. In a vehicle construction, a chassis sill member of outwardly presenting channel section having a flange extending from its lower limb, a body comprising a unitary sheet metal side wall having in the threshold region and substantially throughout the entire length of the passenger compartment of the body an inwardly extending flange and at its lower edge and of similar longitudinal extent a downwardly extending flange, said side wall flanges of the body being arranged in the final assembly of the body with the chassis sill member to overlap, respectively, the top limb and the flange of the lower limb of said sill member and be secured thereto in said overlaps.

13. In a vehicle construction, a chassis sill member of outwardly presenting channel section, a body comprising an outer side panel formed with a threshold portion secured to the upper and lower limbs of said chassis sill member, said member extending rearwardly of said threshold portion at least to the rear wheel supports of the vehicle, and a flat plate closing the open side of said rearwardly extending portion of said chassis sill member and forming therewith a box section structure.

14. In a vehicle construction, a chassis sill member of outwardly presenting channel section, a body comprising an outer side panel formed with a threshold portion secured to the upper and lower limbs of said chassis sill member, said member extending forwardly of said threshold portion along the hood of the vehicle, and a flat plate closing the open side of said forwardly extending portion of said chassis sill member and forming therewith a box section structure.

15. In a vehicle construction, a chassis sill member of outwardly presenting channel section, and a body side member comprising a plate having at its upper edge an inwardly presenting flange, said flange overlapping and secured to the upper limb of the said channel section sill member and said plate closing the open side thereof to form therewith a box section structure, said structure extending forwardly alongside the hood of the vehicle and rearwardly through the wheel housing region.

16. In a vehicle construction, a chassis sill member of outwardly presenting channel section having a flange extending from the edge of its lower limb, and a body member comprising a plate having at its upper edge an inwardly presenting flange, said last mentioned flange overlapping and secured to the upper limb of the said sill member, and said plate secured at its lower edge to said first mentioned flange and closing the open side of said chassis sill member to form therewith a box section structure, said structure extending substantially the full length of the vehicle from the rear to the front wheels thereof.

WILLIAM SWALLOW.